(12) United States Patent
Chai et al.

(10) Patent No.: US 7,897,686 B2
(45) Date of Patent: Mar. 1, 2011

(54) METHOD FOR PREPARING GRAFT RUBBER LATEX HAVING LOW RESIDUAL MONOMER CONTENT

(75) Inventors: Joo-byung Chai, Yeosu-si (KR); Chan-hong Lee, Daejeon (KR); Keun-hoon Yoo, Yeosu-si (KR); Jin-hyoung Lee, Youngcheon-si (KR); Jae-hwan Jung, Yangsan-si (KR)

(73) Assignee: LG Chem, Ltd. (KR)

( * ) Notice: Subject to any disclaimer, the term of this patent is extended or adjusted under 35 U.S.C. 154(b) by 154 days.

(21) Appl. No.: 11/538,205

(22) Filed: Oct. 3, 2006

(65) Prior Publication Data
US 2007/0123657 A1 May 31, 2007

(30) Foreign Application Priority Data
Oct. 4, 2005 (KR) .......................... 10-2005-0092936

(51) Int. Cl.
C08L 25/12 (2006.01)
C08L 51/04 (2006.01)

(52) U.S. Cl. .......................................... 525/71; 523/201
(58) Field of Classification Search .................... 525/71; 523/201
See application file for complete search history.

(56) References Cited

U.S. PATENT DOCUMENTS

| 4,581,408 | A | * | 4/1986 | Trabert et al. | 525/66 |
| 5,367,021 | A | * | 11/1994 | Roovers et al. | 525/67 |
| 5,610,219 | A | * | 3/1997 | Takatani et al. | 524/413 |
| 5,889,113 | A | * | 3/1999 | Mori et al. | 525/71 |
| 6,365,709 | B1 | * | 4/2002 | Heibel et al. | 528/480 |
| 6,620,883 | B2 | | 9/2003 | Gasche et al. | |
| 2001/0000510 | A1 | * | 4/2001 | Sakurai et al. | 514/12 |
| 2001/0016627 | A1 | * | 8/2001 | Koshirai et al. | 525/192 |
| 2001/0046048 | A1 | * | 11/2001 | Harris et al. | 356/338 |
| 2004/0059079 | A1 | * | 3/2004 | Vilasagar et al. | 526/335 |
| 2005/0048390 | A1 | * | 3/2005 | Moribe et al. | 430/109.3 |
| 2005/0197441 | A1 | * | 9/2005 | Shibutani et al. | 524/459 |
| 2006/0069210 | A1 | * | 3/2006 | Berzinis et al. | 525/242 |
| 2009/0016769 | A1 | * | 1/2009 | Hatakeyama et al. | 399/107 |
| 2009/0235625 | A1 | * | 9/2009 | Bansal et al. | 55/524 |

FOREIGN PATENT DOCUMENTS

| CN | 1468268 A | 1/2004 |
| DE | 19741188 | 3/1999 |
| EP | 0 007 810 A2 | 2/1980 |
| WO | 00/014123 | 3/2000 |
| WO | 03/010214 | 2/2003 |

OTHER PUBLICATIONS

English Abstract for Publication No. DE19741188 dated Mar. 25, 1999.

* cited by examiner

*Primary Examiner* — Jeffrey C Mullis
(74) *Attorney, Agent, or Firm* — Cantor Colburn LLP

(57) ABSTRACT

The present invention relates to a method for preparing a graft rubber latex having a low residual monomer content, and more precisely, a method for preparing a graft rubber latex having a high rubber content, which is characterized by graft-copolymerization of a mixture of a rubber latex having a gel content of at least 95% and an average particle diameter of 2,500~5000 Å, a monomer mixture comprising one or more compounds selected from a group consisting of aromatic vinyl compound, vinyl cyan compound and acrylate compound, and small particle size latex produced by emulsion polymerization. The method of the present invention has the advantages of speedy processes with excellent latex stability and at the same time reducing residual monomer content in the latex upon completion of the polymerization, improving perceived quality of the product and increasing yield.

7 Claims, No Drawings

METHOD FOR PREPARING GRAFT RUBBER LATEX HAVING LOW RESIDUAL MONOMER CONTENT

This application claims the benefit of the filing date of Korean patent Application Nos. 10-2005-0092936 filed on Oct. 4, 2005 in the Korean Intellectual Property Office, the disclosure of which is incorporated herein in its entirety by reference.

TECHNICAL FIELD

The present invention relates to a method for preparing a graft rubber latex having a low residual monomer content, and more precisely, a method for preparing a graft rubber latex which is characterized by speedy reaction processes with excellent latex stability to produce a rubber latex having high rubber content, reduced residual monomer content in the latex upon completion of the polymerization, improved perceived quality of the product and significantly increased yield.

BACKGROUND ART

In the production of rubber reinforced latex such as acrylonitrile-butadiene-styrene (ABS), methacrylate-butadiene-styrene (MBS), acrylonitrile-styrene-acrylate (ASA) by emulsion polymerization, it is industrially important to improve the efficiency of rubber reinforcement and increase productivity.

Increased productivity results in a competitive price, therefore, companies have invested much and tried various techniques, in particular they have tried to shorten the reaction time, to increase the rubber content in latex and/or to maximize the solid content.

Even though the methods introduced so far are all effective in increasing productivity and rubber reinforcement efficiency, they have the significant problem of decreasing polymerization conversion rate in the rubber reinforced latex production.

The decrease of polymerization conversion rate leads to a decrease of yield and at the same time can be a crucial factor for increasing the content of residual volatile matters (monomers and other additives). It is also important to minimize the contents of such residues to satisfy consumers by having improved perceived quality, discernible by the five senses, and to meet the environmental regulations and to maintain a high standard of living.

Generally in emulsion polymerization, polymerization conversion rate rapidly increases during the early induction period. But, from the point of 94% conversion, the speed of polymerization conversion rate becomes less. This phenomenon is especially conspicuous in rubber reinforced latex, in which the monomer content drops rapidly from when the polymerization conversion rate reaches 94%. It is believed to be caused by the interruption of an initiator for permeation of monomers into a rubber particle. Short reaction time might result in a decrease of the polymerization conversion rate. In the meantime, high rubber content and high solid content makes the migration of monomers into the inside of rubber particles easy, causing a decrease of the polymerization conversion rate.

Methods have been proposed to reduce residual monomers during polymerization. German Patent No. 19741188 describes a method that uses a long-chained initiator for the polymerization. WO No. 00/14123 described a method to treat α-hydroxy carbonyl compound with an antioxidant. U.S. Pat. No. 6,620,883 introduces multiple initiator treatment. WO No. 03/010214 describes a method including the additional insertion of a third monomer such as acrylate. The method to increase drying efficiency after the polymerization process or to increase the vacuum during extruding and injecting has also been suggested.

However, there is a limit to the ability of those methods to eliminate residual monomers. Furthermore, the physical properties of the resin itself could be changed according to the operations of those methods or the productivity might be decreased by a longer reaction time.

Therefore, a method is provided by the present invention for preparing a graft rubber latex that maximizes the productivity of polymerization without reducing the properties of the resin, minimizes residual monomer content and thereby increases yield and perceived quality of the product.

DISCLOSURE OF THE INVENTION

It is an object of the present invention, to solve the above problems, to provide a method for preparing a graft rubber latex which is characterized by speedy reaction processes with excellent latex stability, effective reduction of residual monomer content in the latex, and significant increased perceived quality of the product and yield.

The above object of the present invention is achieved by the following embodiments of the present invention.

To achieve the above object, the present invention provides a method for preparing a graft rubber latex which is characterized by graft-copolymerization of a mixture of (a) 50~70 weight part of a rubber latex having a gel content of at least 95% and an average particle diameter of 2,500~5,000 Å;

(b) 30~50 weight part of a monomer mixture composed of one or more compounds selected from a group consisting of aromatic vinyl compound, vinyl cyan compound and acrylate compound; and (c) 1~20 weight part of small particle size latex.

The method for preparing a graft rubber latex can additionally include the step of introducing a redox polymerization initiator at the point when polymerization conversion rate reaches at least 94%.

The present invention is described in detail hereinafter.

According to the method for preparing a graft rubber latex of the present invention, a monomer mixture is added to a rubber latex and then a small particle size latex produced by emulsion polymerization is added, followed by graft-copolymerization.

The rubber latex of the above (a) is one or more compounds selected from a group consisting of polybutadiene, butadiene-styrene copolymer, butadiene-alkylacrylate copolymer, polyisoprene and polychloroprene.

The rubber latex of (a) is a large particle size rubber latex produced by enlargement of small particle size rubber latex particles in the presence of an acid.

The small particle size rubber latex is prepared by adding together 100 weight part of 1,3-butadiene, 1~4 weight part of an emulsifying agent, 0.1~0.6 weight part of a polymerization initiator, 0.1~1.0 weight part of electrolytes, 0.1~0.5 weight part of a molecular weight regulator and 90~130 weight part of ion exchange water, followed by reaction for 7~12 hours at 50~65° C., to which 0.05~1.2 weight part of a molecular weight regulator is additionally added, followed by further reaction for 5~15 hours at 55~70° C.

The emulsifying agent used herein is one or more general absorbent emulsifying agents selected from a group consisting of alkyl aryl sulfonate, alkalimethyl alkyl sulfate, sulfonated alkylester, fatty acid soap and alkali salt of rosin acid. To secure the stability of the latex more effectively, a reactive emulsifying agent and a polymer reactive emulsifying agent can be added alone or together with an absorbent emulsifying agent.

As a polymerization initiator, soluble persulfate, peroxide or oxidation-redox system initiator can be used. Particularly, the polymerization initiator can be one or more compounds selected from a group consisting of soluble persulfate such as sodium and potassium persulfate; peroxide fat-soluble polymerization initiator such as cumenehydro peroxide, diisopropyl benzenehydro peroxide, $3^{rd}$ grade butylhydro peroxide, paramethanehydro peroxide and benzoil peroxide; oxidation-redox catalyst containing a reducing agent such as peroxide, sodium formaldehyde sulfoxylate, sodium ethylene diamine, tetraacetate, ferrous sulfate, dextrose, sodium pyrophosphate, sodium sulfite, etc.

The electrolyte herein can be one or more compounds selected from a group consisting of KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, $Na_2HPO_4$, etc.

The molecular weight regulator above can be one or more compounds selected from a group consisting of n-octylmercaptan, n-dodecylmercaptan and t-dodecylmercaptan.

The small particle size rubber latex preferably has an average diameter of 600~1500 Å, a gel content of 95~99%, and a swell index of 12~30.

To 100 weight part of the small particle size rubber latex is slowly added 1.0~4.0 weight part of acetic acid solution for one hour to enlarge the particles, followed by stirring to give a large particle size rubber latex with an average diameter of 2,500~5,000 Å and having a gel content of at least 95%.

The monomer mixture (b) is one or more compounds selected from a group consisting of aromatic vinyl compound, vinyl cyan compound and acrylate compound.

The aromatic vinyl compound can be one or more compounds selected from a group consisting of styrene, α-methylstyrene, p-methylstyrene, vinyl toluene, t-butylstyrene, chlorostyrene, and their substituents.

The vinyl cyan compound can be one or more compounds selected from a group consisting of acrylonitrile, methacrylonitrile and their substituents.

The acrylate compound can be one or more compounds selected from a group consisting of ethylacrylate, methylacrylate, butylacrylate and ethylhexylacrylate.

The small particle size latex of (c) is prepared by emulsion polymerization. Particularly, to 100 weight part of the monomer is added together 6~10 weight part of an emulsifying agent, 0.5~1 weight part of a polymerization initiator, 0.1~0.3 weight part of a molecular weight regulator, 0.1~0.6 weight part of electrolytes and 300 weight part of ion exchange water, followed by reaction for 4 hours at 70° C. When the polymerization conversion rate reaches 94%, 1 weight part of a polymerization initiator is added, followed by extension of the reaction for one hour at 80° C. The polymerization conversion rate, upon termination of the reaction, is 97~98%.

The monomers above can be selected from a group consisting of aromatic vinyl compound, vinyl cyan compound and acrylate compound. These monomers can be used alone or in a mixture of at least two according to the usage of small particle size latex, which means according to the properties of the graft copolymer, and other purposes.

The aromatic vinyl compound, vinyl cyan compound and acrylate compound might be the same compounds as those used for the preparation of the rubber latex of (a).

The emulsifying agent, polymerization initiator, molecular weight regulator and electrolytes might be the same compounds as those used for the preparation of the rubber latex of (a).

The small particle size latex is preferably 20~100 nm in average diameter. The graft-copolymer is prepared by the graft polymerization of (a) 50~70 weight part of rubber latex, (b) 30~50 weight part of a monomer mixture and (c) 1~20 weight part of the small particle size latex, wherein the molar ratio of the rubber latex to the monomer mixture is preferably 20:80~40:60. For the graft polymerization above, 0.1~2 weight part of an emulsifying agent, 0.2~1.0 weight part of a molecular weight regulator and 0.05~2.0 weight part of a polymerization initiator can be added.

In the graft copolymerization, 10~30 weight % of the monomer mixture is added in the early reaction stage together with 1~20 weight part of the small particle size latex of (c) at one time or continuously, and 70~90 weight % of the monomer mixture is added with an emulsifying agent and an initiator after 0~60, and preferably 0~30 minutes, from the beginning of the reaction. The continuous addition is preferably performed for 2 hours.

The method for preparing the graft rubber latex of the present invention can additionally include the step of adding a redox polymerization initiator containing a fat-soluble initiator when the polymerization conversion rate reaches 94% in order to dramatically reduce the residual monomer content.

The redox polymerization initiator can be added to the reactor following the addition of the reactant containing the monomer mixture at least twice at 30 minute intervals or continuously for one~two hours.

In the method for preparing a graft rubber latex comprising the above steps, the total solid content in the graft rubber latex is preferably 45~55 weight % and the reaction time is preferably less than 3 hours.

The graft rubber latex produced by the method of the present invention preferably has a residual monomer content of up to 5,000 ppm. If the residual monomer content is more than 5,000 ppm, the excessive organic volatile component in the latex can harm humans and apparent quality becomes poor during the processes of condensation, drying and processing into solids.

To secure oxidative stability during the processing of the graft rubber latex, an antioxidant emulsion is added and well mixed, to which a general cohesive agent such as $H_2SO_4$, $MgSO_4$, $CaCl_2$, or $Al_2(SO_4)_3$, well known to those in the art, is added, followed by condensation and pulverization.

The present invention provides a graft rubber latex having a residual monomer content of up to 5,000 ppm prepared by the method explained above.

BEST MODE FOR CARRYING OUT THE INVENTION

Practical and presently preferred embodiments of the present invention are illustrated as shown in the following Examples.

However, it will be appreciated that those skilled in the art, on consideration of this disclosure, may make modifications and improvements within the spirit and scope of the present invention.

Example

Example 1

To a nitrogen substituted polymerization reactor were added 60 weight parts of solid content of polybutadiene rubber latex having a rubber particle diameter of 3100 Å and a gel content of 98%, 92 weight part of ion exchange water and 0.2 weight part of a fatty acid soap. The temperature of the reactor was maintained as 50° C. Then, 7.6 weight part of styrene, 3.73 weight part of acrylonitrile, 2 weight parts of solid content of polystyrene latex having an average particle size of 40 nm, 0.3 weight part of $3^{rd}$ degree dodecylmercaptan, 0.087 weight part of sodium pyrophosphate, 0.11 weight part of dextrose, 0.002 weight part of ferrous sulfate and 0.1 weight part of $3^{rd}$ degree butylhydro peroxide were added to the reactor, and the temperature of the reactor was raised to 70° C. for 30 minutes.

Then, to the reactor were added 0.4 weight part of a fatty acid soap, 19.2 weight part of styrene, 7.42 weight part of acrylonitrile and 0.15 weight part of $3^{rd}$ degree cumenehydro peroxide continuously at 70° C. for 90 minutes.

Upon completion of the continuous addition, to the reactor were added 0.05 weight part of cumenehydro peroxide, 0.043 weight part of sodium pyrophosphate, 0.055 weight part of dextrose and 0.001 weight part of ferrous sulfate, followed by raising the reaction temperature to 80° C. for 30 minutes.

To the reactor were additionally added 0.05 weight part of cumenehydro peroxide, 0.043 weight part of sodium pyrophosphate, 0.055 weight part of dextrose and 0.001 weight part of ferrous sulfate. Thirty minutes later, the reaction was terminated.

Upon completion of the reaction, the produced graft rubber latex was coagulated in the presence of 2 weight part of sulfuric acid solution with the addition of 0.4 weight part of an antioxidant emulsion (particle size: up to 0.5 μm), which was washed and dried to give graft copolymer powders.

To the graft copolymer powders were added styrene-acrylonitrile (SAN), having a molecular weight of about 100,000 and an acrylonitrile content of 28%, and a lubricant, followed by extrusion and injection to give a sample having a final rubber content of 16.5%.

Example 2

An experiment was performed in the same manner as described in example 1 except that 5 weight part of polystyrene latex having a particle size of 40 nm was added and a redox initiator comprising 0.1 weight part of cumenehydro peroxide, 0.086 weight part of sodium pyrophosphate, 0.11 weight part of dextrose and 0.002 weight part of ferrous sulfate was continuously added for 60 minutes.

Example 3

An experiment was performed in the same manner as described in example 1 except that 2 weight part of polystyrene-acrylonitrile copolymer latex having an average particle size of 40 nm and an acrylonitrile content of 28% was added instead of 2 weight part of polystyrene latex.

Example 4

An experiment was performed in the same manner as described in example 1 except that 2 weight part of polystyrene-acrylonitrile copolymer latex having an average particle size of 20 nm and an acrylonitrile content of 28% was added instead of 2 weight part of polystyrene latex.

Comparative Example 1

An experiment was performed in the same manner as described in example 1 except that the small particle size polystyrene latex was not added together with the polybutadiene latex having a gel content of 75%, and a redox initiator comprising 0.1 weight part of cumenehydro peroxide, 0.086 weight part of sodium pyrophosphate, 0.11 weight part of dextrose and 0.002 weight part of ferrous sulfate was added once after the addition of the monomer mixture.

Compositions for the preparation of the graft rubber latexes of examples 1~4 and comparative example 1 are shown in Table 1.

TABLE 1

| | | Example 1 | Example 2 | Example 3 | Example 4 | Comparative Example 1 |
|---|---|---|---|---|---|---|
| Rubber latex | Gel content (%) | 98 | 98 | 98 | 98 | 75 |
| | Rubber content (%) | 60 | 60 | 60 | 60 | 60 |
| Small particle size latex | Component | PS | PS | SAN | SAN | — |
| | Adding amount (weight part) | 2 | 5 | 2 | 2 | — |
| | Particle size (nm) | 40 | 40 | 40 | 20 | — |
| Initiator adding method | | Batch adding twice | Continuous adding | Batch adding twice | Batch adding twice | Batch adding once |

Experimental Example

The physical properties of the graft rubber latexes prepared in examples 1~3 and comparative example 1 are measured as follows and the results are shown in Table 2.

Izod impact strength: measured by ASTM D256 (the thickness of a sample: ¼").

Tensile strength: measured by ASTM D638.

Melt Flow Index (MFI): measured by ASTM D1238 under the conditions of 220° C., 10 kg.

Surface gloss: measured by ASTM D528 at the angle of 45°.

Gloss retention: A pellet obtained from an extruder was retained in an injector for 15 minutes at 250° C. to give a glossy sample. Gloss at 45° was measured, which was compared with that of the sample obtained from injection at 200° C. without retention. A deviation value was obtained therefrom. The smaller the deviation value, the more excellent the gloss retention was.

Residual monomer content: The final polymer in latex form was measured by gas chromatography (GC), which was converted into a compared value for 100 weight part of solid.

TABLE 2

|  | Example 1 | Example 2 | Example 3 | Example 4 | Comparative Example 1 |
|---|---|---|---|---|---|
| Impact strength (¼") (kg · cm/cm) | 32 | 31 | 33 | 32 | 25 |
| Tensile strength (kg/cm²) | 490 | 510 | 490 | 500 | 460 |
| Melt Flow Index (220° C./ 10 kg) | 23 | 25 | 22 | 21 | 18 |
| Surface gloss (45°) | 100 | 105 | 102 | 105 | 90 |
| Gloss retention (250° C., 15 min) | 3 | 1 | 2 | 2 | 10 |
| Residual monomer content (ppm) | 3,000 | 1,000 | 3,500 | 1,500 | 10,000 |

As shown in Table 1, the graft rubber latexes prepared in examples 1~4, wherein the small particle size latex produced by emulsion polymerization was added during the graft copolymerization, were confirmed to have low residual monomer content but improved surface gloss and gloss retention, which could be good assets for the final product, particularly for perceived quality.

In the meantime, the graft rubber latex prepared in comparative example 1, wherein the small particle size latex produced by emulsion polymerization was not added, exhibited high residual monomer content and poor surface gloss and gloss retention.

INDUSTRIAL APPLICABILITY

As explained hereinbefore, the method for preparing the rubber latex of the present invention has the advantages of excellent latex stability by having speedy reaction processes, reducing the residual monomer content in the latex upon completion of the polymerization, improving perceived image quality of the product, and increasing yield significantly.

Those skilled in the art will appreciate that the conceptions and specific embodiments disclosed in the foregoing description may be readily utilized as a basis for modifying or designing other embodiments for carrying out the same purposes as the present invention. Those skilled in the art will also appreciate that such equivalent embodiments do not depart from the spirit and scope of the present invention as set forth in the appended claims.

The invention claimed is:

1. A method for preparing a graft rubber latex which is characterized by graft copolymerization of a mixture containing
    (a) 50 to 70 weight part of rubber latex having a gel content of at least 95% and an average particle diameter of 2,500 to 5,000 Å;
    (b) 30 to 50 weight part of a monomer mixture composed of one or more compounds selected from the group consisting of an aromatic a vinyl compound, vinyl cyan compound and an acrylate compound; and
    (c) 1 to 20 weight part of a latex which has an average particle diameter of 20 to 100 nm and,
    is prepared by emulsion polymerization with one or more compounds selected from the group consisting of an aromatic vinyl compound and a vinyl cyan compound, and has an average particle diameter of 20 to 100 nm,
    wherein a step of adding a redox polymerization initiator is additionally included when the polymerization conversion rate reaches at least 94%, and
    wherein the rubber latex of (a) is one or more compounds selected from a group consisting of polybutadiene, butadiene-styrene copolymer, butadiene-alkylacrylate copolymer, polyisoprene and polychloroprene.

2. The method for preparing the graft rubber latex according to claim 1, wherein the rubber latex of (a) is a large particle size rubber latex prepared by enlarging the small particle size rubber latex particles in the presence of an acid.

3. The method for preparing the graft rubber latex according to claim 1, wherein the molar ratio of the rubber latex of (a) to the monomer mixture of (b) is 20:80 to 40:60.

4. The method for preparing the graft rubber latex according to claim 1, wherein the redox polymerization initiator is one or more compounds selected from a group consisting of cumene hydroperoxide, diisopropylbenzene hydroperoxide, azobisisobutylnitrile, tertiary butyl hydroperoxide, and benzoyl peroxide.

5. The method for preparing the graft rubber latex according to claim 1, wherein the redox polymerization initiator is added as a bundle twice at 30 minute intervals or is added continuously for to 2 hours from when the polymerization conversion rate reaches at least 94%.

6. The method for preparing the graft rubber latex according to claim 1, wherein the reaction time to give the graft rubber latex having low residual monomer content is up to 3 hours.

7. The method for preparing the graft rubber latex according to claim 1, having a residual monomer content of up to 5000 PPM based on 100 weight parts of solids of the graft rubber latex.

* * * * *